(12) United States Patent
Israel

(10) Patent No.: US 9,936,110 B1
(45) Date of Patent: Apr. 3, 2018

(54) REAR VIEW MIRROR MOUNTABLE AUDIOVISUAL RECORDING APPARATUS

(71) Applicant: Jakim Israel, Park Forest, IL (US)

(72) Inventor: Jakim Israel, Park Forest, IL (US)

( * ) Notice: Subject to any disclaimer, the term of this patent is extended or adjusted under 35 U.S.C. 154(b) by 131 days.

(21) Appl. No.: 15/152,803

(22) Filed: May 12, 2016

(51) Int. Cl.
| | |
|---|---|
| *H04N 5/78* | (2006.01) |
| *H04N 5/225* | (2006.01) |
| *B60R 11/04* | (2006.01) |
| *B60R 1/12* | (2006.01) |
| *B60R 11/00* | (2006.01) |
| *H04N 5/76* | (2006.01) |

(52) U.S. Cl.
CPC ............. *H04N 5/2253* (2013.01); *B60R 1/12* (2013.01); *B60R 11/04* (2013.01); *H04N 5/2256* (2013.01); *B60R 2001/1253* (2013.01); *B60R 2011/0033* (2013.01); *B60R 2011/0059* (2013.01); *H04N 5/76* (2013.01)

(58) Field of Classification Search
None
See application file for complete search history.

(56) References Cited

U.S. PATENT DOCUMENTS

| | | |
|---|---|---|
| 5,978,017 A | 11/1999 | Tino |
| 8,325,028 B2 | 12/2012 | Schofield et al. |
| D724,642 S | 3/2015 | Cho |

*Primary Examiner* — Eileen Adams
(74) *Attorney, Agent, or Firm* — Stevenson IP, LLC

(57) ABSTRACT

A rear view mirror mountable audiovisual recording apparatus including a base unit and a mounting unit. A motion sensor, a light emitting diode, and a camera are disposed on the base unit. A speaker is disposed on a left surface of the mounting unit. An activation control, a charging port, and a secure digital memory card slot are disposed on a right surface of the mounting unit. A central processing unit is disposed within the mounting unit. A plurality of a pair of hooked clamps disposed on the mounting unit is selectively engageable around each of an upper surface and a lower surface of a rear view mirror.

3 Claims, 6 Drawing Sheets

REAR VIEW MIRROR MOUNTABLE AUDIOVISUAL RECORDING APPARATUS

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of interior vehicle recording apparatuses are known in the prior art. However, what has been needed is a rear view mirror mountable audiovisual recording apparatus including a base unit and a mounting unit. What has been further needed is a motion sensor, a light emitting diode, and a camera disposed on the base unit. A speaker is disposed on a left surface of the mounting unit. An activation control, a charging port, and a secure digital memory card slot are disposed on a right surface of the mounting unit. A central processing unit is disposed within the mounting unit. Lastly, what has been needed is for a plurality of a pair of hooked clamps disposed on the mounting unit to be selectively engageable around each of an upper surface and a lower surface of a rear view mirror. The rear view mirror mountable audiovisual recording apparatus thus allows a user to easily mount a recording device on the rear view mirror in order to potentially deter a negative or deadly interaction between the user and a law enforcement officer during a traffic stop.

FIELD OF THE INVENTION

The present invention relates to interior vehicle recording apparatuses, and more particularly, to a rear view mirror mountable audiovisual recording apparatus.

SUMMARY OF THE INVENTION

The general purpose of the present rear view mirror mountable audiovisual recording apparatus, described subsequently in greater detail, is to provide a rear view mirror mountable audiovisual recording apparatus which has many novel features that result in a rear view mirror mountable audiovisual recording apparatus which is not anticipated, rendered obvious, suggested, or even implied by prior art, either alone or in combination thereof.

To accomplish this, the present rear view mirror mountable audiovisual recording apparatus includes a rectangular base unit having a front side, a back side, a right side, a left side, a top side, and a bottom side. A motion sensor and a light emitting diode are disposed on the front side of the base unit. A camera is also rotatably and medially disposed on the front side of the base unit between the motion sensor and the light emitting diode. The camera has both audiovisual recording and zooming capabilities.

The rear view mirror mountable audiovisual recording apparatus further includes a substantially rectangular mounting unit having a top surface, a bottom surface, a rectangular front surface, a convexly curved back surface, a right surface, and a left surface. Each of the base unit and the mounting unit is optionally plastic for increased durability. A speaker is disposed on the left surface of the mounting unit. An activation control, a charging port, and a secure digital memory card slot are disposed on the right surface of the mounting unit. A battery compartment is disposed within the mounting unit proximal the right surface. A rechargeable battery is disposed within the battery compartment. A central processing unit is also disposed within the mounting unit. The motion sensor, the light emitting diode, the camera, the speaker, the activation control, the charging port, the secure digital memory card slot, the rechargeable battery, and the central processing unit are in operational communication with each other.

Each of a right pair and a left pair of a plurality of a pair of hooked clamps has an upper hooked clamp and a lower hooked clamp. The upper hooked clamp of each of the right pair and the left pair is disposed on the top surface of the mounting unit adjacent to and frontwardly extended from the front surface and proximal the right surface and the left surface, respectively. The lower hooked clamp of each of the right pair and the left pair is disposed on the bottom surface of the mounting unit adjacent to and frontwardly extended from the front surface and proximal the right surface and the left surface, respectively. The upper hooked clamp of the right pair is collinearly disposed with the lower hooked clamp of the right pair, and the upper hooked clamp of the left pair is collinearly disposed with the lower hooked clamp of the left pair. The plurality of the pair of hooked clamps is selectively engageable around each of an upper surface and a lower surface of a rear view mirror.

The activation control is configured to activate the camera, and the light emitting diode is configured to illuminate when the camera is activated. The motion sensor is configured to direct and rotate the camera to a location where motion is detected by the motion sensor. The mounting unit is configured to have wireless capabilities in order to transmit a recording of the camera to a remote wireless enabled electronic device.

Thus has been broadly outlined the more important features of the present rear view mirror mountable audiovisual recording apparatus so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
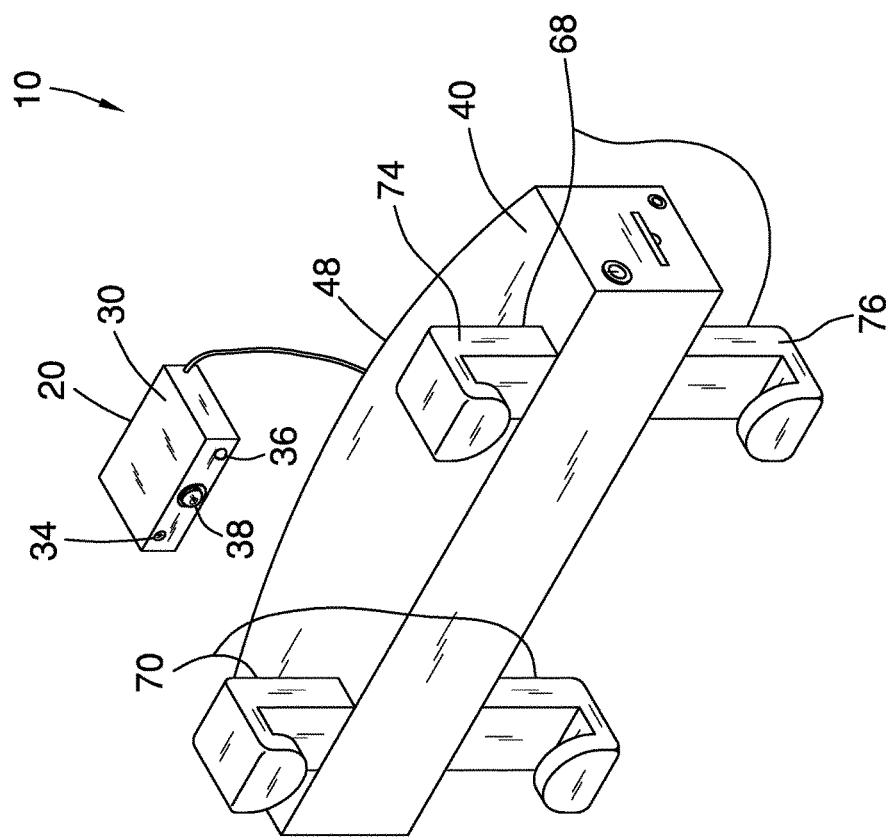
FIG. 1 is a front isometric view.
Figure 2:
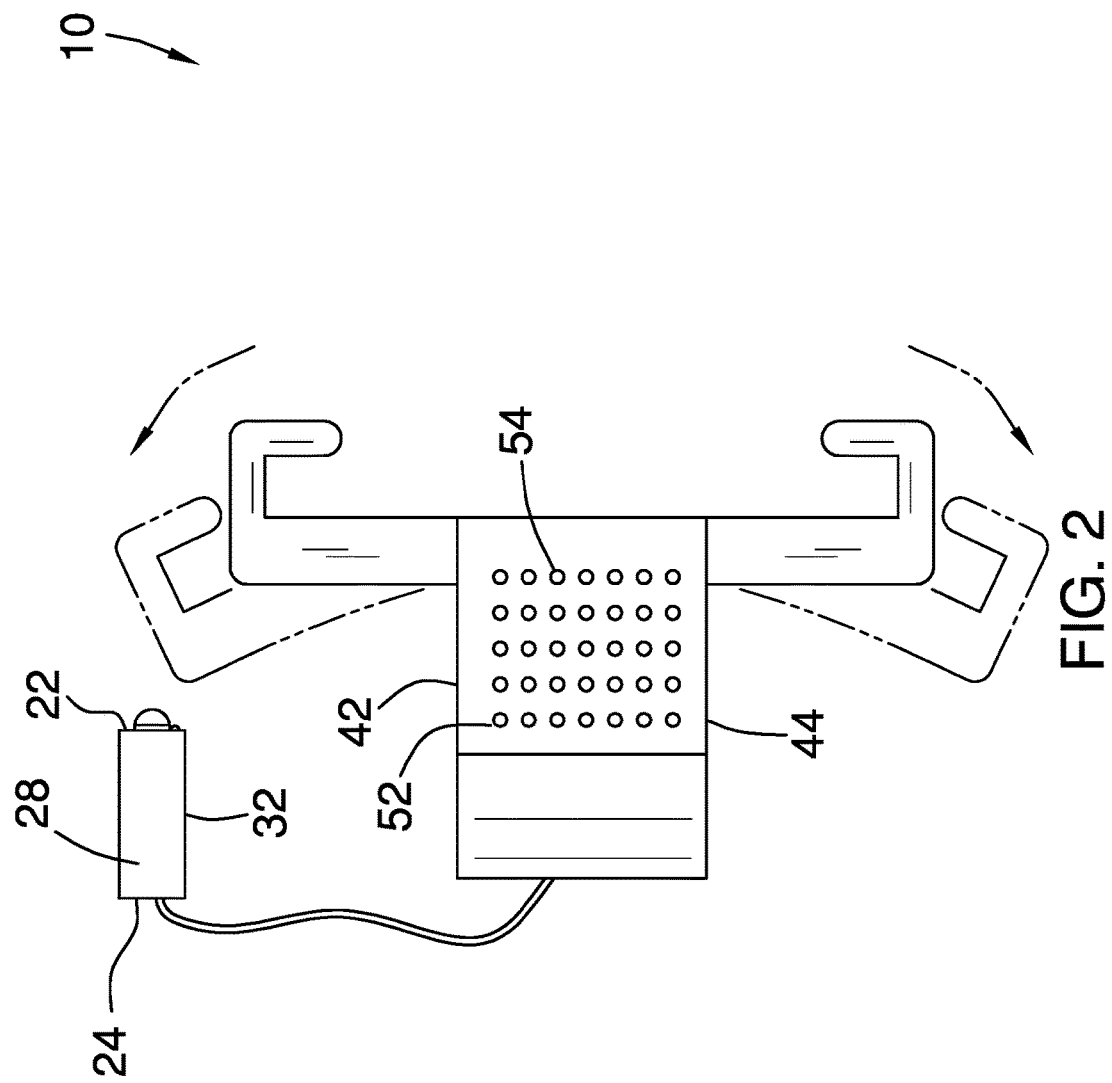
FIG. 2 is a left side elevation view.
Figure 3:
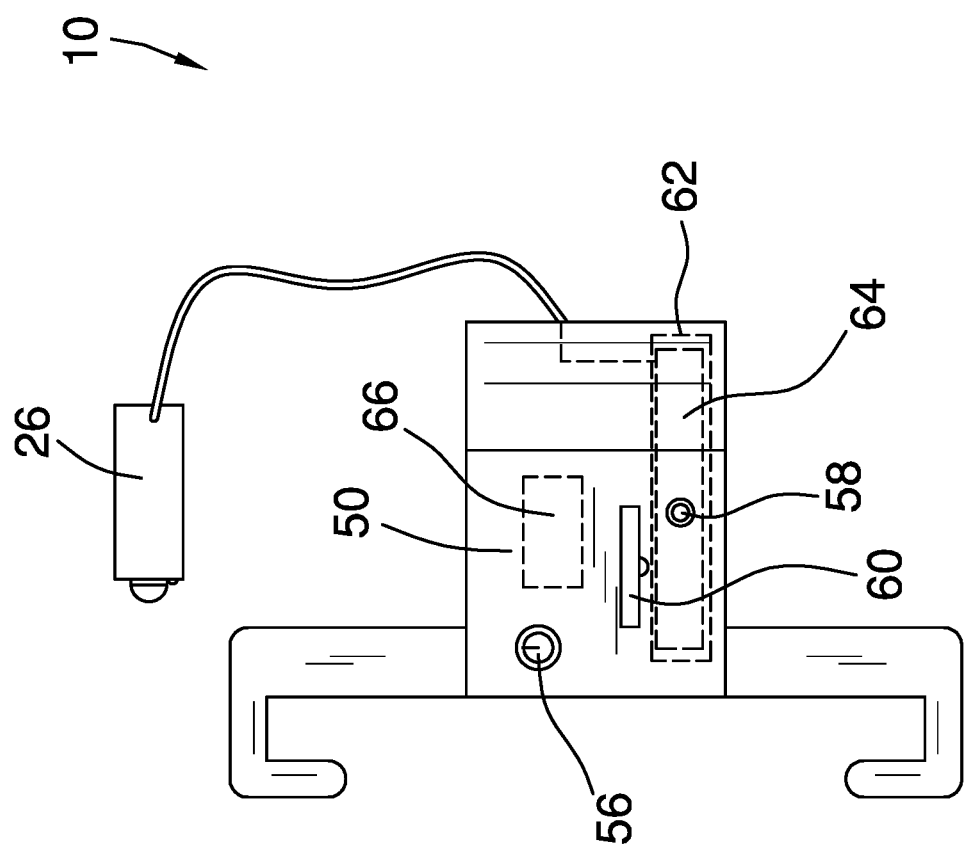
FIG. 3 is a right side elevation view.
Figure 4:
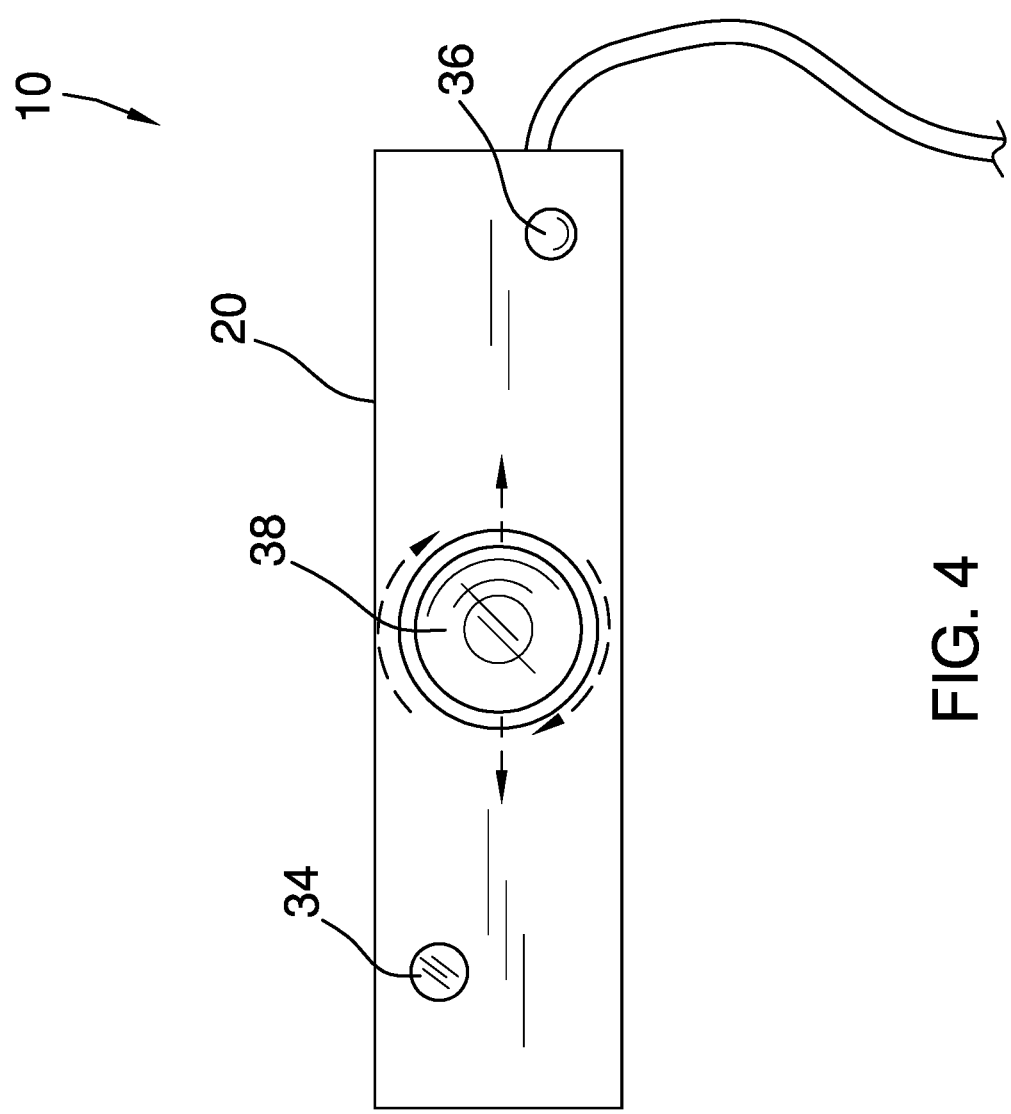
FIG. 4 is a detail view showing a base unit.
Figure 5:
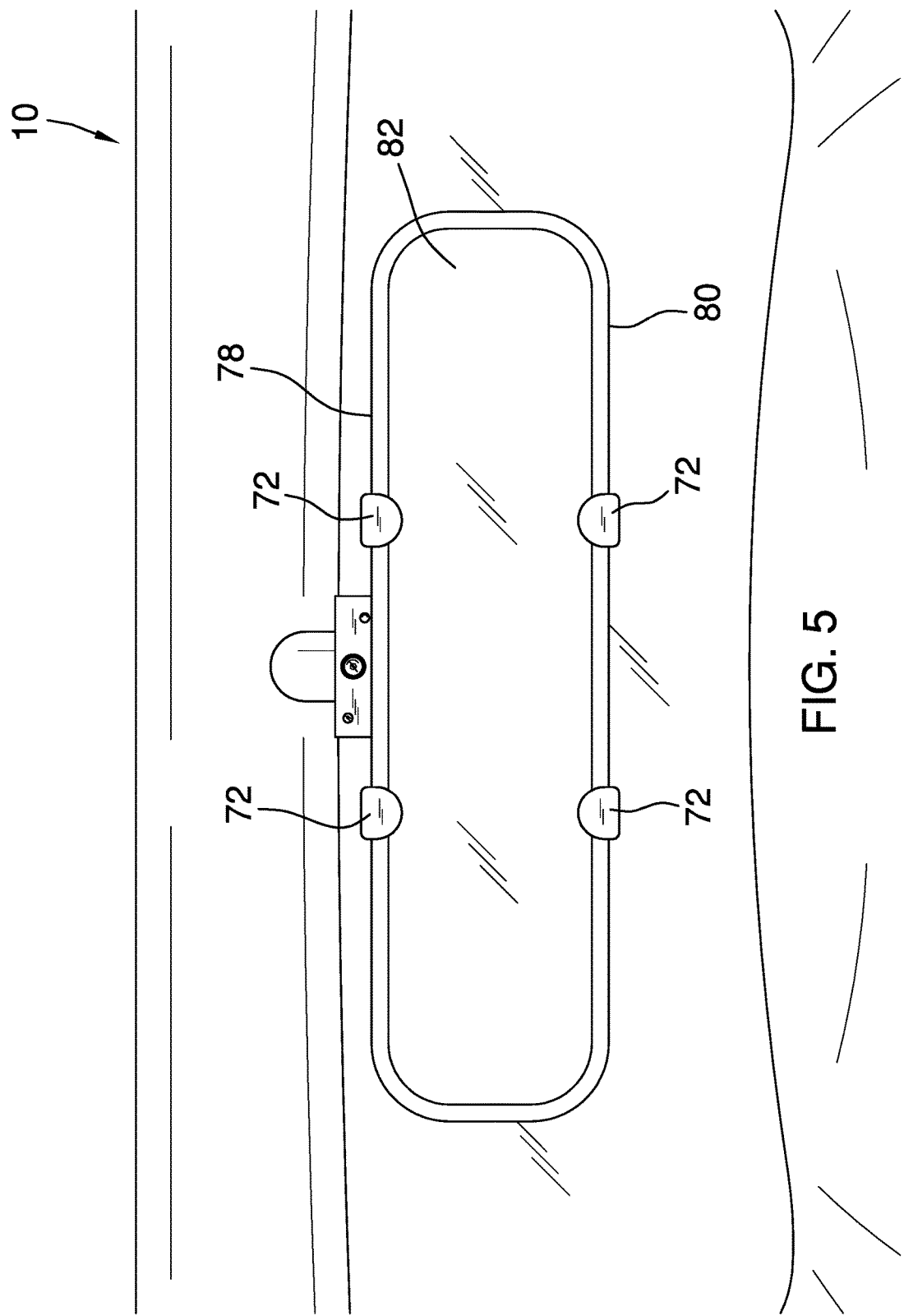
FIG. 5 is an in use view.
Figure 6:
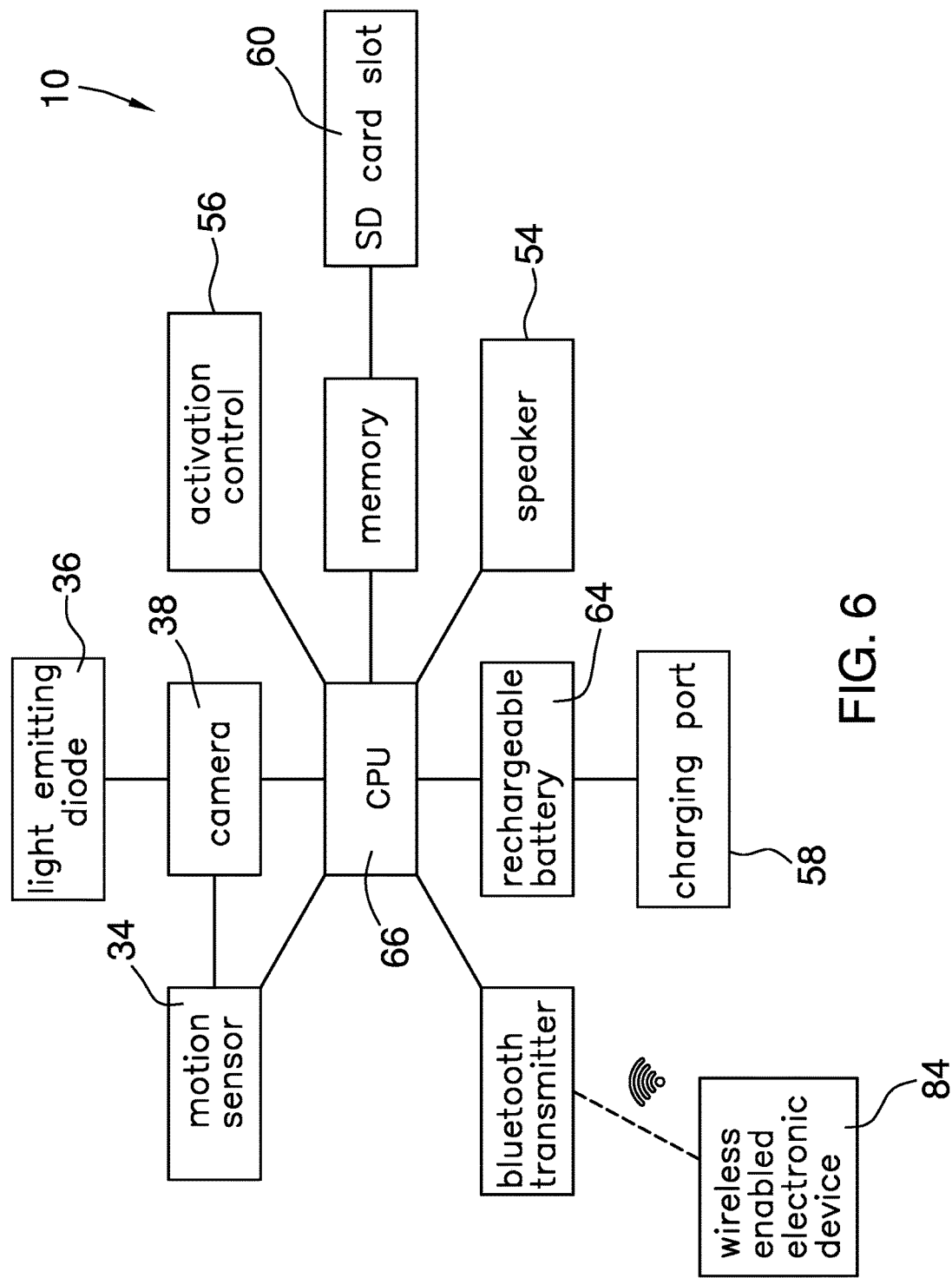
FIG. 6 is a block diagram.

With reference now to the drawings, and in particular FIGS. 1 through 6 thereof, an example of the instant rear view mirror mountable audiovisual recording apparatus employing the principles and concepts of the present rear view mirror mountable audiovisual recording apparatus and generally designated by the reference number 10 will be described.

Referring to FIGS. 1 through 6 the present rear view mirror mountable audiovisual recording apparatus 10 is illustrated. The rear view mirror mountable audiovisual recording apparatus 10 includes a rectangular base unit 20 having a front side 22, a back side 24, a right side 26, a left side 28, a top side 30, and a bottom side 32. A motion sensor 34 and a light emitting diode 36 are disposed on the front side 22 of the base unit 20. A camera 38 is also rotatably and medially disposed on the front side 22 of the base unit 20 between the motion sensor 34 and the light emitting diode. 36.

The rear view mirror mountable audiovisual recording apparatus 10 further includes a substantially rectangular mounting unit 40 having a top surface 42, a bottom surface 44, a rectangular front surface 46, a convexly curved back surface 48, a right surface 50, and a left surface 52. A speaker 54 is disposed on the left surface 52 of the mounting unit 40. An activation control 56, a charging port 58, and a secure digital memory card slot 60 are disposed on the right surface 50 of the mounting unit 40. A battery compartment 62 is disposed within the mounting unit 40 proximal the right surface 50. A rechargeable battery 64 is disposed within the battery compartment 62. A central processing unit 66 is also disposed within the mounting unit 40. The motion sensor 34, the light emitting diode 36, the camera 38, the speaker 54, the activation control 56, the charging port 58, the secure digital memory card slot 60, the rechargeable battery 64, and the central processing unit 66 are in operational communication with each other.

Each of a right pair 68 and a left pair 70 of a plurality of a pair of hooked clamps 72 has an upper hooked clamp 74 and a lower hooked clamp 76. The upper hooked clamp 74 of each of the right pair 68 and the left pair 70 is disposed on the top surface 42 of the mounting unit 40 adjacent to and frontwardly extended from the front surface 46 and proximal the right surface 50 and the left surface 52, respectively. The lower hooked clamp 76 of each of the right pair 68 and the left pair 70 is disposed on the bottom surface 44 of the mounting unit 40 adjacent to and frontwardly extended from the front surface 46 and proximal the right surface 50 and the left surface 52, respectively. The upper hooked clamp 74 of the right pair 68 is collinearly disposed with the lower hooked clamp 76 of the right pair 68, and the upper hooked clamp 74 of the left pair 70 is collinearly disposed with the lower hooked clamp 76 of the left pair 70. The plurality of the pair of hooked clamps 72 is selectively engageable around each of an upper surface 78 and a lower surface 80 of a rear view mirror 82.

The activation control 56 is configured to activate the camera 38, and the light emitting diode 36 is configured to illuminate when the camera 38 is activated. The motion sensor 34 is configured to direct and rotate the camera 38 to a location where motion is detected by the motion sensor 34. The mounting unit 40 is configured to have wireless capabilities in order to transmit a recording of the camera 38 to a remote wireless enabled electronic device 84.

What is claimed is:

1. A rear view mirror mountable audiovisual recording apparatus comprising:
 a rectangular base unit having a front side, a back side, a right side, a left side, a top side, and a bottom side;
 a motion sensor disposed on the front side of the base unit;
 a light emitting diode disposed on the front side of the base unit;
 a camera rotatably and medially disposed on the front side of the base unit between the motion sensor and the light emitting diode;
 a substantially rectangular mounting unit having a top surface, a bottom surface, a rectangular front surface, a convexly curved back surface, a right surface, and a left surface;
 a speaker disposed on the left surface of the mounting unit;
 an activation control disposed on the right surface of the mounting unit;
 a charging port disposed on the right surface of the mounting unit;
 a secure digital memory card slot disposed on the right surface of the mounting unit;
 a battery compartment disposed within the mounting unit proximal the right surface;
 a rechargeable battery disposed within the battery compartment;
 a central processing unit disposed within the mounting unit; and
 a plurality of a pair of hooked clamps comprising a right pair and a left pair, each of the right pair and the left pair having an upper hooked clamp and a lower hooked clamp, wherein the upper hooked clamp of each of the right pair and the left pair is disposed on the top surface of the mounting unit adjacent to and frontwardly extended from the front surface and proximal the right surface and the left surface, respectively, and the lower hooked clamp of each of the right pair and the left pair is disposed on the bottom surface of the mounting unit adjacent to and frontwardly extended from the front surface and proximal the right surface and the left surface, respectively;
 wherein the upper hooked clamp of the right pair is collinearly disposed with the lower hooked clamp of the right pair;
 wherein the upper hooked clamp of the left pair is collinearly disposed with the lower hooked clamp of the left pair;
 wherein the motion sensor, the light emitting diode, the camera, the speaker, the activation control, the charging port, the secure digital memory card slot, the rechargeable battery, and the central processing unit are in operational communication with each other;
 wherein the activation control is configured to activate the camera;
 wherein the light emitting diode is configured to illuminate when the camera is activated;
 wherein the motion sensor is configured to direct and rotate the camera to a location where motion is detected by the motion sensor;
 wherein the mounting unit is configured to have wireless capabilities in order to transmit a recording of the camera to a remote wireless enabled electronic device;
 wherein the plurality of the pair of hooked clamps is selectively engageable around each of an upper surface and a lower surface of a rear view mirror.

2. The rear view mirror mountable audiovisual recording apparatus of claim 1 wherein the base unit is plastic.

3. The rear view mirror mountable audiovisual recording apparatus of claim 2 wherein the mounting unit is plastic.

* * * * *